May 15, 1923.

M. W. DYE

AUTOMOBILE HAT HOLDER

Filed April 18, 1922

1,454,962

Inventor
MARK W. DYE

By Harry Schroeder
Attorney

Patented May 15, 1923.

1,454,962

UNITED STATES PATENT OFFICE.

MARK W. DYE, OF SEATTLE, WASHINGTON.

AUTOMOBILE HAT HOLDER.

Application filed April 18, 1922. Serial No. 554,769.

*To all whom it may concern:*

Be it known that I, MARK W. DYE, a citizen of the United States, residing at Seattle, in the county of King and State of Washington, have invented certain new and useful Improvements in Automobile Hat Holders, of which the following is a specification.

My invention is a hat holder which may be mounted in the top of an automobile for holding the hats of the occupants of the automobile in said top out of the way.

Referring to the annexed drawing in which my invention is illustrated and which forms a part of this specification:

Figure 1:
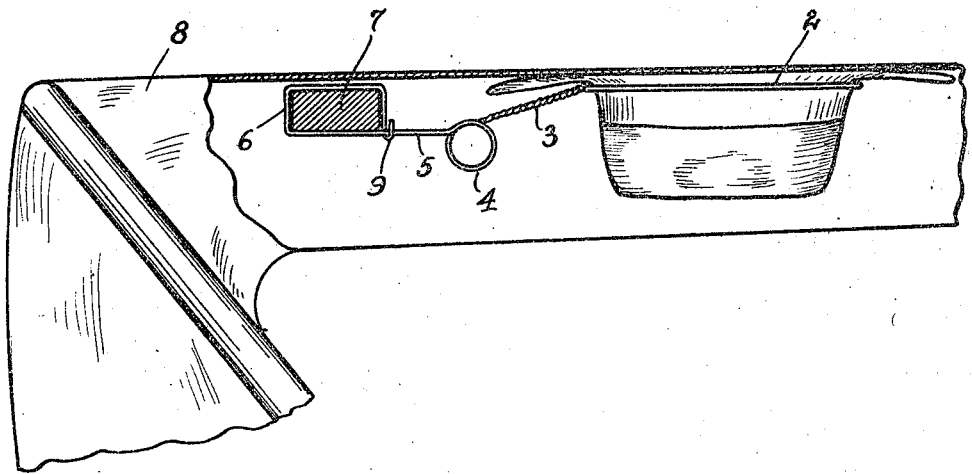
Figure 1 is a side view of my hat holder mounted in the top of an automobile.
Figure 2:
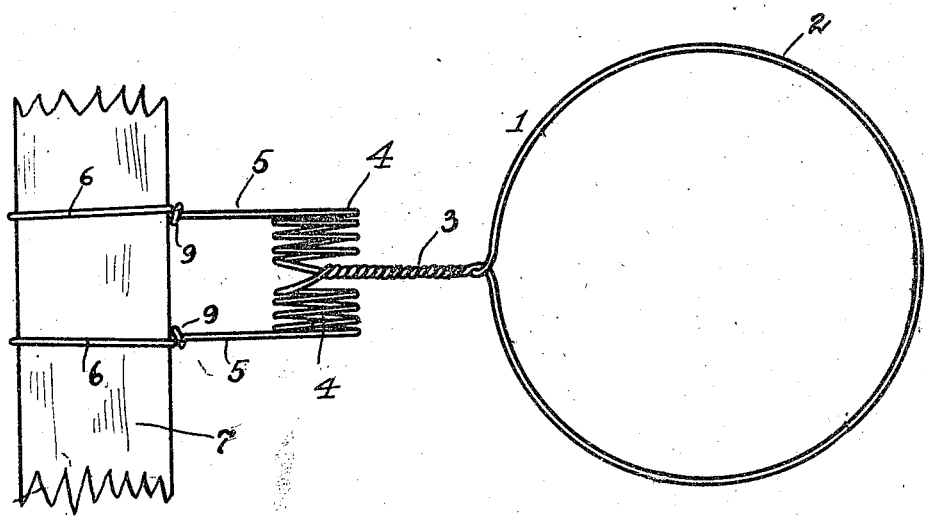
Figure 2 is a plan view of my hat holder.

My hat holder is made of a single piece of wire 1, which is first bent in the middle into a horizontal circular loop 2, then twisted at the ends of the loop into an arm 3, then coiled at the ends of the arm into two vertical spring coils 4—4, then the ends of the coils are bent rearwardly into two arms 5—5 which are bent upwardly at their ends into loops 6—6 around a transverse member 7 of the top 8 of an automobile, and the ends of said loop are bent at 9—9 around said arms and secured thereto. The loop 2 may be sprung down against the tension of the springs 4—4 so that the hat may be placed in said loop and held therein by its band resting thereupon, and then released, whereupon the springs 4—4 swing the loop upwardly and hold the hat with its band against the under side of the automobile top.

Having described my invention, I claim:

A hat holder made of a single piece of wire bent first in the middle into a hat loop, then twisted from the ends of said loop into an arm, then coiled from the ends of said arm into two spring coils, and then bent rearwardly from the outer ends of said coils into parallel and spaced apart arms, each adapted to be bent around a transverse bar in the top of an automobile and terminating in a hook adapted to hook around that portion of the arm adjacent the transverse bar for securing the hat holder in position.

In testimony whereof I affix my signature.

MARK W. DYE.